June 27, 1967   H. R. OETERS   3,328,772
DATA QUEUING SYSTEM WITH USE OF RECIRCULATING DELAY LINE
Filed Dec. 23, 1964   7 Sheets-Sheet 1

INVENTOR
HAROLD R. OETERS

BY *David N. Koffsky*

ATTORNEY

United States Patent Office 3,328,772
Patented June 27, 1967

3,328,772
DATA QUEUING SYSTEM WITH USE OF
RECIRCULATING DELAY LINE
Harold R. Oeters, Woodstock, N.Y., assignor to International Business Machines Corporation, Armonk, N.Y., a corporation of New York
Filed Dec. 23, 1964, Ser. No. 420,590
10 Claims. (Cl. 340—172.5)

This invention relates to data transmission systems and more particularly to a data transmission system which is capable of transferring data between asynchronously operating machines.

Data transmission between a computer's central processing unit (CPU) and a data receiver-transmitter terminal unit is often complicated by the fact that (1) the data handling rate of a CPU is much higher than most terminal units and (2) a constant stream of data must be kept available to the transmitting terminal to enable line synchronization at the receiving end. As an example of the different rates of data transmission, one CPU now in existance has the ability to transfer a character to a terminal every 1.4 milliseconds, whereas the terminal requires over 4000 milliseconds to transmit that same character over a transmission line.

With respect to data synchronization, terminal units are often initially synchronized by a synch pulse and then begin to sample the transmission line at a predetermined rate. If data characters are impressed upon the line by the transmitting terminal at a continuous rate, the sampled outputs at the receiving end are accurate representations of the transmitted data. However, if for some reason a gap exists in the transmitted data, the receiving terminal will still continue to sample the incoming line thereby producing erroneous data indication.

To prevent the above-mentioned problems from occurring, a buffer mechanism must generally be placed between a CPU and its data terminal. One type of buffer takes the form of a set of character registers which are energized by the CPU to store a series of data characters and are then accessed by the terminal as it desires additional characters for transmission. Such a configuration is costly since a separate register and accessing circuitry must be provided for each character. A less expensive means for performing this function is provided by a delay line storage device which accepts the characters from the CPU, stores them serially in a queue, and provides them to the terminal upon request.

While the queuing system is conceptually simple, the desire to utilize the CPU to its full data processing capacity considerably complicates matters. Due to the high operating speeds of the CPU and the rates which it is able to provide data to an output, it is desirable to multiply the number of data terminals to allow simultaneous or multiplex data transmission from the CPU. It also becomes desirable to provide capabilities for feeding one data terminal from more than one CPU. To provide these capabilities, requires that the buffer data queuing system be able to accept data when the CPU is ready to provide it (generally available only during one out of a pluarlity of cycles) and to provide the queued data to the data transmitter at the specified time is calls for it in the same order in which the data was received from the CPU. It is additionally desirable to be able to reverse the process, that is, accept data from the terminal and provide it to the CPU upon request.

Accordingly, it is an object of this invention to provide an improved data buffer system.

It is another object of this invention to provide an improved bidirectional data queuing system which is capable of providing data in the same order in which it was received.

It is still another object of this invention to provide a queuing system which is capable of receiving data at one time in its cycle, and additionally capable of providing the data in the same order in which it was received at another time of its cycle.

And yet another object of this invention is to provide a recirculating data queuing system having only one access point, which is capable of receiving data at one time during its cycle, and of providing that same data in the same order as received during a second time of its cycle.

In accordance with the above-stated objects, a data queuing system is provided which employs a delay means adapted to store a plurality of data segments in discrete time slots. Recirculating means having a propagation time of at least one time slot provide the necessary reentrant circuitry to enable recirculation of the time slots through the delay means. A first data transfer means has access to the data queue through the recirculating means during the last time slot of the queue, and a second data transfer means has access during the first time slot of the queue. Shift ahead logic means including time slot bypass means are connected to the recirculating means and are responsive to the finding of an empty time slot to energize the bypass means. This thereby accomplishes a forward shift of the contents of a succeeding time slot into an empty preceding time slot. Thus, when data segments are inserted into the last time slot of the queuing system by the first data transfer means, they are automatically shifted forward in time to the head of the queue, there to be available in the same order as inserted to the second data transfer means.

To accomplish a transfer of data from the second data transfer means to the first data transfer means, backward shift logic is provided. The backward shift logic compares the contents of two successive time slots to determine if the first time slot has a data segment contained therein and the second time slot is empty. If this is determined to be the case, the data segment in the first time slot is delayed for the duration of one time slot thereby accomplishing the desired backward shift. Thus, if the second data transfer means inserts a data segment into the first time slot of the queue, it is automatically shifted backwardly to the end of the queue there to be available in the same order as inserted to the first data transfer means.

The foregoing and other objects, features and advantages of the invention will be apparent from the following more particular description of a preferred embodiment of the invention, as illustrated in the accompanying drawings.

Figure 1:
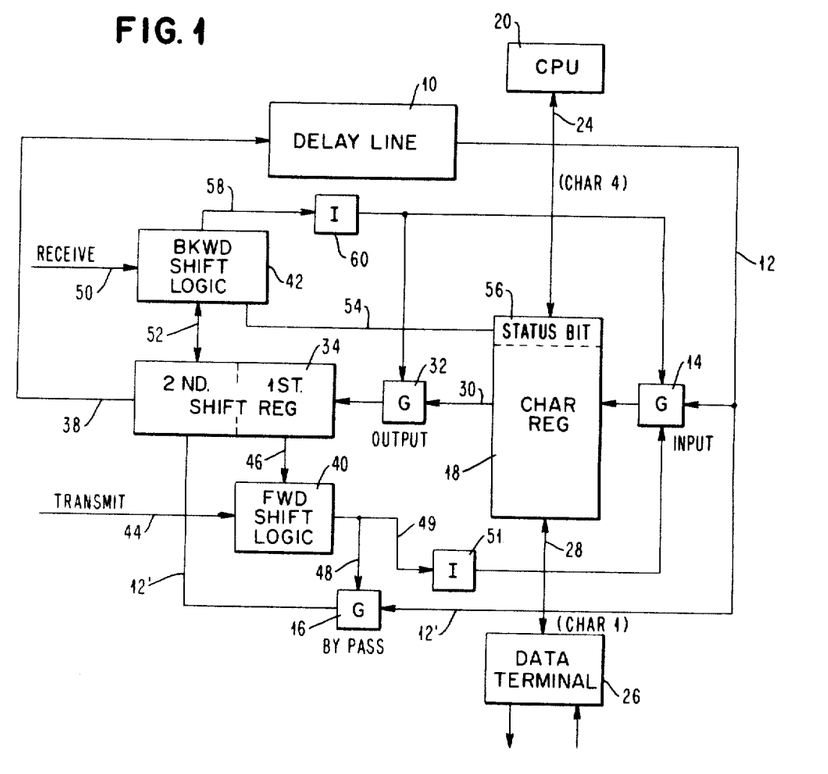
FIG. 1 is a block diagram of the invention.

Referring now to FIG. 1, Delay Line 10 provides the data storage capability needed to perform the data queuing operation. In the ensuing discussion, the discrete data segments inserted into Delay Line 10 will be referred to as characters. In the particular example to be considered, each character is ten bits in length with the first bit being a status bit indicating whether or not nine data bits follow it. This status bit is hereinafter referred to as the occupied status bit. As is well known, digital characters circulate in a serial fashion through Delay Line 10, with the total time taken up by each character within Delay Line 10 being termed a time slot. In this example, the length of Delay Line 10 is made sufficient to accommodate two and a fraction time slots and the entire recirculating system has a total recirculation time of four time slots. In other words, a sum total of four characters can be accommodated at any one time in the system of FIG. 1. As should be obvious, these figures are chosen merely for explanatory purposes and are not meant to limit the invention.

The output from Delay Line 10 is applied via conductor 12 to Character Register input gate 14 and via conductor 12' to bypass gate 16. The output from input gate 14 is applied to Character Register 18 which comprises a sufficient number of parallel-arranged binary triggers to accept and store a single data character—in this case, ten triggers. Input gate 14 performs the function of accepting the serially occurring bits on conductor 12 and gating them into the proper binary triggers in Character Register 18. CPU 20 and Data Terminal 26 are connected via conductors 24 and 28, respectively, to Character Register 18. All character insertions and extractions within the queuing system take place over conductors 24 and 28.

A data character inserted into Character Register 18 from Delay Line 10 remains in place for the duration of one time slot. When a character has been in Character Register 18 for the duration of a time slot, it is serially shifted out via conductor 30 and output gate 32 into a two position serial Shift Register 34. The output from serial Shift Register 34 is applied via conductor 38 to the input of Delay Line 10 to complete the data recirculation path.

As aforementioned, the entire recirculation path is able to store four data characters in four discrete time slots. In other words, assuming the aforementioned ten bit characters and further assuming that a microsecond of circulation time is required to store one bit, then each character occupies a ten microsecond time slot with the overall circulation time being 40 microseconds. Of this 40 microseconds, each bit spends 10 microseconds within Character Register 18, 2-3 microseconds within Shift Register 34 and the remaining 27-28 microseconds within Delay Line 10. As mentioned above, the first 1 microsecond bit position of each 10 microsecond time slot is an occupied status bit which indicates whether the remaining nine bit positions within the time slot are empty or have a character stored therein. The occupied status bit is generated at the time a data character is inserted into Character Register 18 from either CPU 20 or Terminal 26.

Because of the fact that the CPU 20 is communicating with other data queuing systems and input-output equipment, it is only able to communicate with the queuing system of FIG. 1 for the duration of one time slot. In this system, it is the time slot during which the fourth character time slot resides in Character Register 18. This time will be hereinafter referred to as Char 4 time slot and the other character times will be referred to respectively as Char 1, Char 2 and Char 3 time slots. Each of these time slots is the time specifically within which a respective data character stored therein resides in Character Register 18.

In a manner similar to that for the CPU, Terminal 26 only communicates with the queuing system during the Char 1 time slot. As will become hereinafter apparent, Char 1 time defines the beginning of the queue and Char 4 time defines the end of the queue. Means must therefore be provided to assure that characters inserted into the queue by CPU 20 during Char 4 time slot are transferred in the same order as inserted into the Char 1 time slot where they can be accessed by Terminal 26. Likewise, characters inserted by Terminal 26 into the Char 1 time slot must be transferred to the Char 4 time slot, during which time CPU 20 can access them.

The means for assuring that these respective character shifts occur, are respectively, Forward Shift Logic circuit 40 and Backward Shift Logic circuit 42. Forward Shift Logic circuit 40 has inputs applied to it via conductors 44 and 46 and it provides outputs to bypass gate 16 via conductor 48 and to input gate 14 via conductor 49 and inverter 51. Forward Shift Logic circuit 40 is energized by the application of a transmit conditioning input to conductor 44. A transmit input is indicative of the fact that characters are being transmitted from CPU 20 via the queuing system to Terminal 26 where they are to be sent to a receiving station.

In response to the transmit energization, Forward Shift Logic circuit 40 examines, via input conductor 46, the occupied status bit of the time slot presently held in Character Register 18 when that bit is shifted into the first position of Shift Register 34. If Forward Shift Logic circuit 40 finds that the occupied status bit is "0" (indicating that no character is contained in the time slot presently in Character Register 18) it energizes output conductors 48 and 49. Conductor 48 conditions bypass gate 16 while the level on conductor 49 is inverted by inverter 51 and blocks input gate 14. This allows the contents of a succeeding time slot (which is being inserted into Character Register 18 from Delay Line 10 to replace the time slot presently being shifted out) to bypass the time slot delay which occurs in Character Register 18 and to be inserted directly into the second position of Shift Register 34 via conductor 12' and bypass gate 16. In essence, therefore, the contents of a succeeding time slot are automatically shifted into a preceding time slot once the preceding time slot is found to be empty by Forward Shift Logic circuit 40.

When it is desired to receive data from a distant station via Terminal 26, and pass the data through the queuing system and into CPU 20, the queuing system is put into the receive status. As aforestated, Terminal 26 is only able to insert characters into the queuing system during the first time slot of the queue and CPU 20 is only able to accept or receive characters during the last time slot of the queue. Backward Shift Logic circuit 42 is therefore provided to shift the characters inserted into the queue from Terminal 26 from the first time slot of the queue back to the last time slot thereby making the characters available to CPU 20. Three inputs are applied to Backward Shift Logic circuit 42 via receive status line 50, conductor 52 from the second position of serial Shift Register 34 and conductor 54 from status bit trigger 56 in Character Register 18. The output from Backward Shift Logic circuit 42 is applied via conductor 58, through inverter 60 to input gate 14 and output gate 32.

Backward Shift Logic circuit 42 examines the occupied status bits of two succeeding time slots via input conductors 52 and 54. When the contents of a time slot presently in Character Register 18 are serially shifted out into Shift Register 34, the first shift results in the occupied status bit being extracted from status bit trigger 56 and placed in the first position of Shift Register 34. Assuming that the time slot presently in Character Register 18 is occupied by a character, the occupied status bit sets the first position of Shift Register 34 to the "1" state. Immediately after the "1" occupied status bit is shifted out of Character Register 18, the new occupied status bit for the new time slot arrives via input gate 14 and is placed in occupied status trigger 56. This results in conductor 54 being energized either to the "1" or "0" state dependent on whether the new time slot has a character stored therein.

Upon the next shift, the "1" occupied status bit is transferred from the first to the second position of Shift Register 34 and causes conductor 52 to be energized. At this time, Backward Shift Logic circuit 42 compares the two occupied status bits to see if there is a data character presently stored in Character Register 18 and furthermore, to see whether the time slot being inserted into Character Register 18 also contains a data character. If it is found that the time slot being inserted into Character Register 18 is unoccupied (status bit trigger 56 in "0" state) Backward Shift Logic circuit 42 energizes its output conductor 58. This output is inverted by inverter 60 and deconditions input gate 14 and output gate 32. The deconditioning if input gate 14 prevents the contents of the succeeding time slot from altering the present data character in Character Register 18. The deconditioning of output gate 32 prevents the data character presently held in Character Register 18 from being transferred out and inserted into Shift Register 34. Means are also provided (not shown in FIG. 1) to reset the occupied status bit in character register 18 to properly indicate the fact that Character Register 18 is occupied. In this manner, the character stored in Character Register 18 is effectively shifted backward in time to succeeding time slots.

Figure 2:
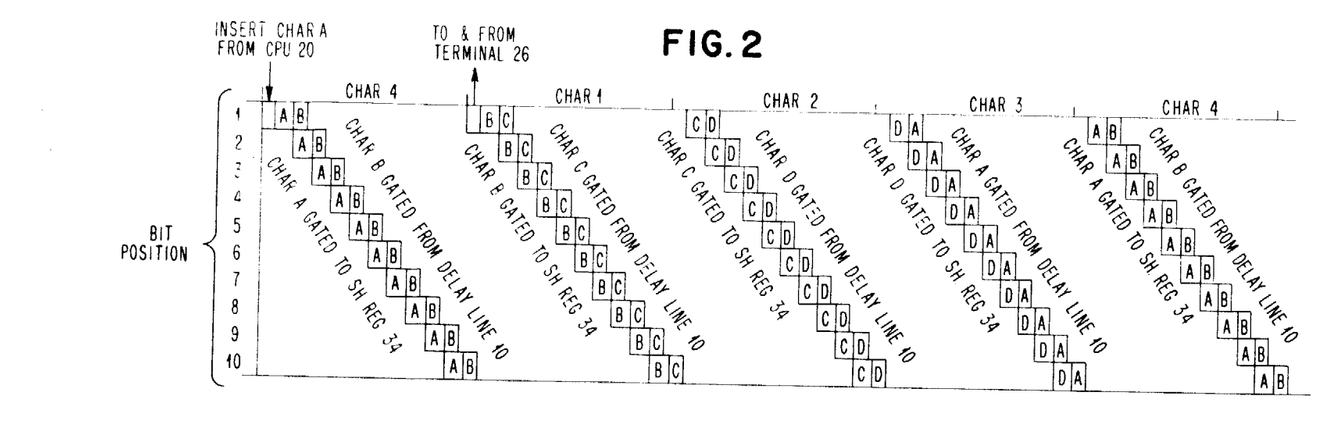
FIG. 2 is a character timing chart showing the position of various data characters at specific times in a cycle in the system of FIG. 1.

To better understand the data circulation aspects of the invention, attention is directed to FIG. 2 wherein there is shown a chart which depicts the time relationships between each of the four character time slots and characters stored therein. The horizontal axis of the chart depicts the passage of time slots through Character Register 18 and along the chart's vertical axis is depicted bits 1–10 for each of the characters. The specific character bits are shown as rectangles with the respective character letters being contained therein.

Considering first Char 4 time slot, it may be assumed that at the beginning of the time slot that all ten bits of character A are inserted broadside into Character Register 18 from CPU 20. Further assume that characters B, C and D are contained within time slots 1–3, respectively. Immediately following the insertion of character A, the first bit thereof is transferred to Shift Register 34 (occupied status bit). Immediately thereafter, bit 1 of character B is gated from Delay Line 10 into Character Register 18. The remaining bits of character A are serially shifted in time sequence into Shift Register 34 with corresponding bits of character B immediately following the exiting character A bits. At the termination of Char 4 time slot, character B resides in Character Register 18, and character A has passed out of Shift Register 34 and into Delay Line 10. At the beginning of the Chart 1 time slot (assuming that this is a transmit cycle), Terminal 26 can access character B for transmission purposes. If for some reason Terminal 26 is not transmitting, character B is gated into Shift Register 34 in the same manner as for character A during the Char 4 time slot. Immediately thereafter—on a bit following bit basis—character C is gated into Character Register 18 to replace exiting character B bits. This sequence occurs over and over as shown by the chart until all characters are inserted or extracted as desired by either CPU 20 or Terminal 26.

Figure 3A:
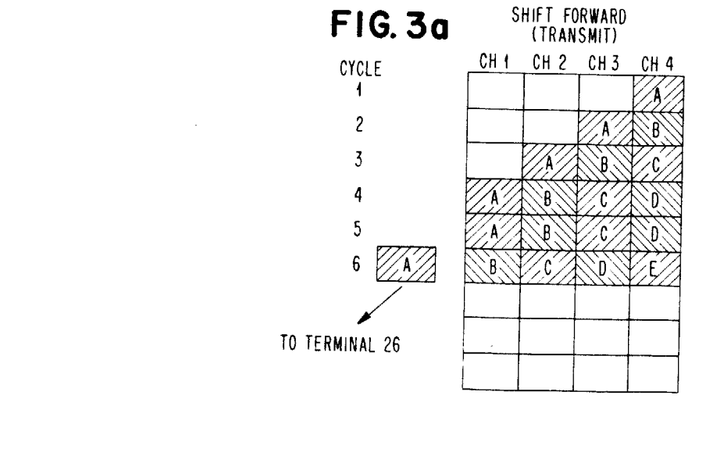
FIGS. 3A and 3B are character timing charts showing the shifting operation of the system of FIG. 1.
Figure 3B:
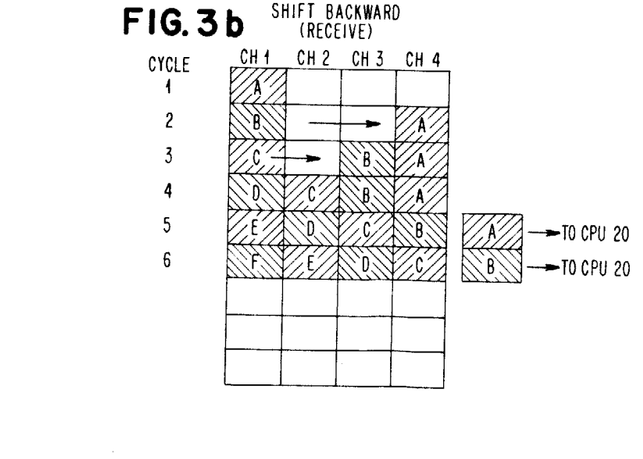

FIGS. 3A and 3B are charts which described the shifting operation as it occurs in the system of FIG. 1. In FIG. 3A, the shift forward or "transmit from CPU 20 to Terminal 26" is illustrated, whereas FIG. 3B shows the shift backward operation whereby CPU 20 receives characters from Terminal 26. Along the horizontal axes of both charts are plotted character time slots and along the vertical axes are depicted discrete cycles of operation. A cycle is defined as the time required for a character time slot to make one complete revolution through the queuing system.

The operation of the system of FIG. 1 will now be described in conjunction with FIGS. 2, 3A and 3B. Turning first to the shift forward or transmit operation shown in FIG. 3A, assume that no data characters are stored in any of character time slots 1–4.

At the beginning of Chart 4 time slot in cycle 1, input line 24 from CPU 20 is energized and inserts character A in the Char 4 time slot. During Char 4 time slot (see FIG. 2), character A is gated to Shift Register 34 and then to Delay Line 10.

At the beginning of the Char 1 time slot in cycle 2, the occupied status bit is shifted out of Character Register 18 and into the first position of Shift Register 34, e.g., see gating of character B in FIG. 2. Since Char 1 time slot contains no data character, this occupied status bit is a "0" and causes line 46 to become energized. Forward Shift Logic circuit 40 samples line 46 and responds to the "0" signal by producing an output on line 48 to condition bypass gate 16 for the passage of information on conductor 12'. The output from Forward Shift Logic circuit 40 is also applied via conductor 49 and inverter 51 to decondition input gate 14. Immediately after this action, the occupied status bit of Char 2 time slot begins to emerge from Delay Line 10. However, due to the deconditioning of input gate 14 and the conditioning of bypass gate 16, the occupied status bit and all remaining bits of this time slot completely bypass the delay time they would normally experience within Character Register 18 and are inserted via conductor 12' into the second position of Shift Register 34. While no data character is contained in the Char 2 time slot it can be seen that if one were, it would be shifted from the Char 2 time slot, forward in time into the Char 1 time slot. So long as the occupied status bits of preceding character time slots indicate the "0" or unoccupied status, the succeeding character time slots will have their contents shifted ahead by one time slot. Thus, at the beginning of the Char 3 time slot when its occupied status bit is shifted into Shift Register 34, the bypass circuitry is energized and previously inserted character A is shifted from the Char 4 time slot to the Char 3 time slot. During the immediately following Char 4 time slot, input line 24 from CPU 20 is energized and inserts character B into the queue.

During cycle 3, characters A and B both experience identical shifts in time slots as described above for character A. In other words, character A is shifted from the Char 3 time slot to the Char 2 time slot while character B is shifted from the Char 4 time slot to the Char 3 time slot. This action progresses until all of the time slots have been filled. Terminal 26 is then able to access characters A–D during the Char 1 time slot of successive cycles, with each character extracted being replaced by a character shifted into the vacated time slot. In this manner, Terminal 26 always receives the characters in the same order in which they were transmitted by CPU 20 into the queuing system.

In order now for CPU 20 to receive data characters from Terminal 26, the system reverses its mode of operation in that data characters are shifted by delaying them in time rather than by shifting them forward in time (FIG. 3B).

As in the above description of the forward shift operation, assume that no data characters are contained within any of the Char time slots of the queuing system. Receive status line 50 is conditioned and transmit status line 44 is deconditioned. During the Char 1 time slot, line 28 is conditioned and Terminal 26 inserts character A into Character Register 18. This data insertion causes status bit trigger 56 in Character Register 18 to be set to the "1" state. Immediately after character A is inserted during the Char 1 time slot, the contents of time slot 2 begin to become available at the output of Delay Line 10. This fact results in the "1" occupied status bit of character A being shifted out of status bit trigger 56 and through output gate 32 into the first position of Shift Register 34. Immediately thereafter, the occupied status bit of time slot 2 is inserted into status bit trigger 56. In this case, since no data character is contained within time slot 2, the status bit trigger 56 is set to "0." The "0" output level from status bit trigger 56 is transmitted via conductor 54 to Backward Shift Logic circuit 42. Next, the first bit of character A is shifted out of Character Register 18 through output gate 32 and into the first position of Shift Register 34 with the "1" occupied status bit being transferred to the second position of Shift Register 34.

The shifting of the "1" status bit into the second position of Shift Register 34 energizes conductor 52. The "1" level on conductor 52 and "0" level on conductor 54 in combination with receive input 50 cause Backward Shift Logic circuit 42 to produce an up output on conductor 58. This condition indicates that a data character is contained within the time slot presently stored in Character Register 18 and that no data character is contained in the time slot now becoming available from Delay Line 10. This up potential is inverted by inverter 60 and deconditions both input gate 14 and output gate 32 thereby blocking any further transfers of data into or out of Character Register 18. Backward Shift Logic circuit 42 also prevents (via conductor 52) the occupied status bit and first bit contained in Shift Register 34 from being transmitted to Delay Line 10. It additionally causes status bit trigger 56 to be reset to the "1" state. No action need be taken with respect to the first bit of data character A in Character Register 18 due to the fact that input gate 14 is deconditioned before the first bit can be altered by an input from time slot 2. Backward Shift Logic circuit 42 continues its data blocking function for the period of time slot 2, thereby causing data character A to be effectively delayed and inserted into time slot 2.

At the beginning of each Char time slot, Backward Shift Logic circuit 42 performs the identical data examination feature above described and determines whether a time slot whose contents are to be shifted into Character Register 18 has a data character stored therein or is empty. If the time slot is found to be empty, the character presently stored in Character Register 18 is frozen in place for the duration of the new time slot thereby causing it to be shifted backward in time into the succeeding time slot. Thus, at the conclusion of cycle 1, character A is found to reside in the Char 4 time slot. During cycle 2, character B is inserted into the Char 1 time slot and is shifted into the Char 3 time slot. This occurrence repeats itself until the entire queuing system is filled with characters. Under normal circumstances, CPU 20 has a much faster character transfer rate than Terminal 26 and is thereby able to extract characters from the queuing system at a much faster rate than Terminal 26 can insert them. Thus, it is to be readily expected that as soon as an inserted character reaches the Char 4 time slot, it will be immediately accessed by CPU 20. (For clarity's sake, CPU 20 is shown as accessing data characters beginning with cycle 5.) In this manner, CPU 20 receives each character from the queuing system in the identical order in which it was inserted by Terminal 26.

Figure 4A:
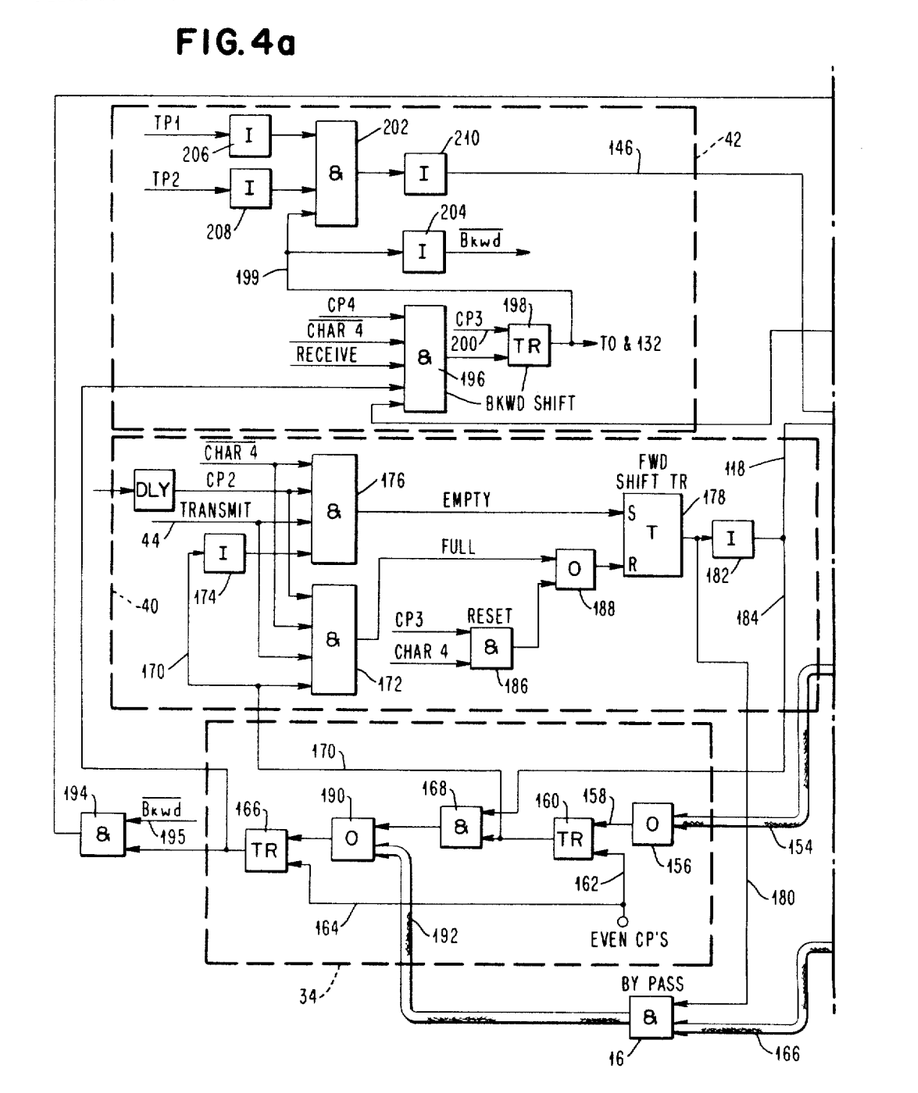
FIGS. 4A and 4B are a detailed block diagram of the system of FIG. 1.
Figure 4B:
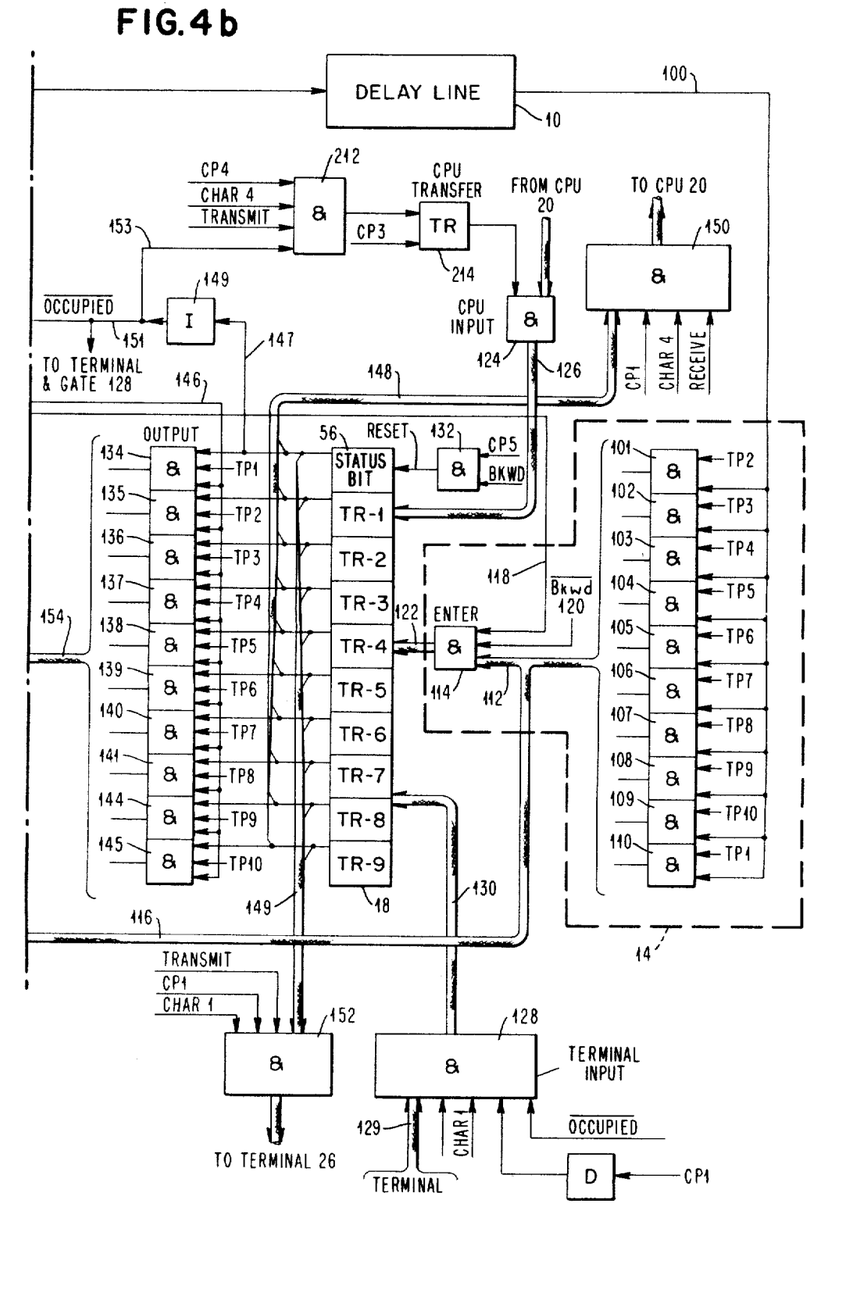
Figure 5:
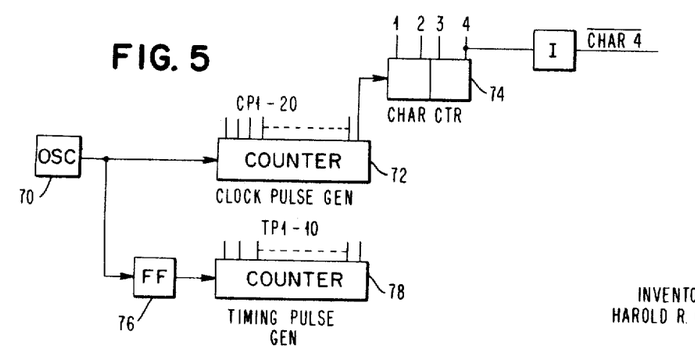
FIG. 5 is a block diagram of the timing system for the system of FIG. 4
Figures 6A, 7:
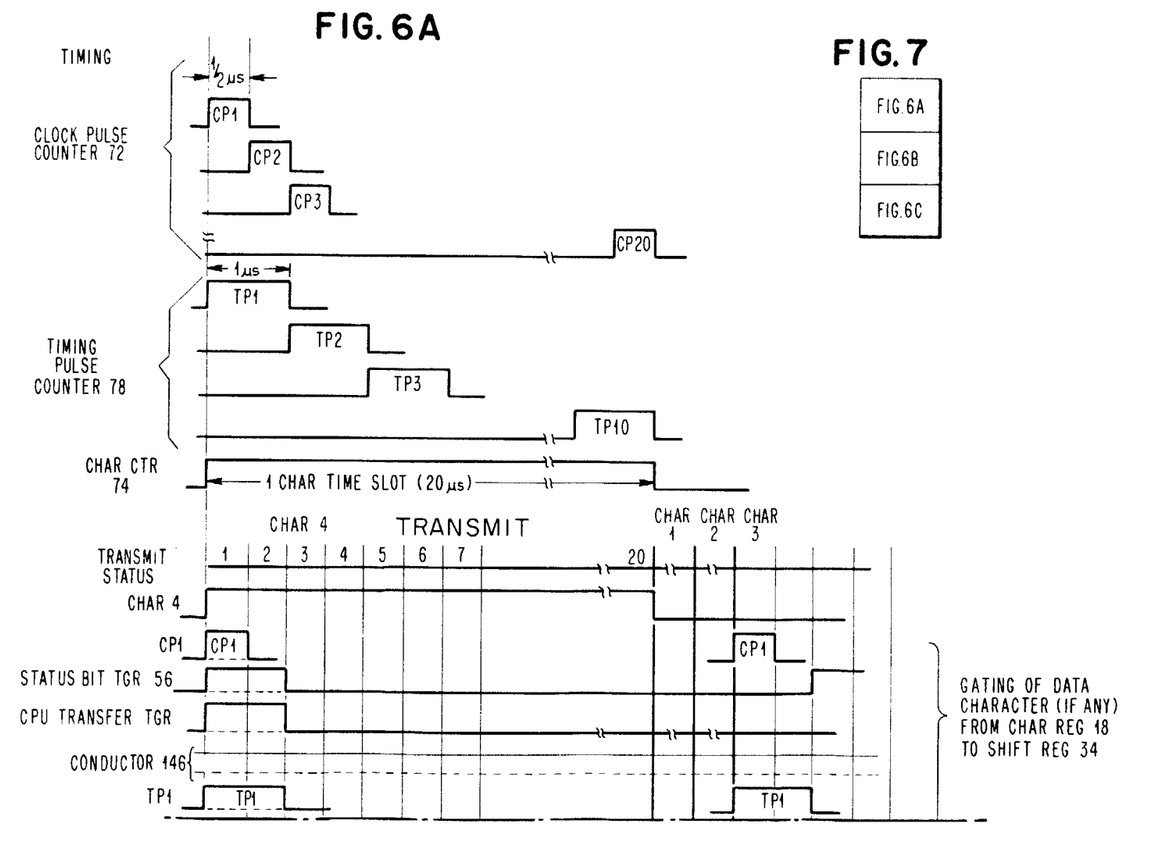
FIGS. 6A, 6B and 6C are timing charts which aid in the discussion of the detailed operations of the systems of FIGS. 4 and 5.
FIG. 7 is a diagram indicating the arrangement of FIGS. 6A, 6B and 6C.

Referring now to FIGS. 4A, 4B and 5, the detailed logical circuitry of the invention and its operation will be described. In FIG. 5, the circuitry necessary for the creation of the control, clock and timing pulses is shown. This type of circuitry is well known and will only be briefly described. The waveforms generated by each of the elements are shown in FIG. 6A. Oscillator 70 is any well known circuit capable of producing a steady stream of one-half microsecond pulses. These pulses are fed to clock pulse generator 72 which produces a series of 20 one-half microsecond clock pulses on its 20 output lines (CP1–CP20, FIG. 6A). Connected to the 20th output line, is a four stage character counter which energizes each of its outputs for the duration of one character time slot. The character 4 output line is also inverted and used as a Char 4 control signal. Also connected to the output of oscillator 70 is a binary flip-flop 76 for the purpose of providing a 2-to-1 count down in the oscillator's output rate. The output of flip-flop 76 is fed to timing pulse counter 78 which produces 10 one microsecond output pulses (TP1–TP10, FIG. 6A) on each of its output lines. Each of the pulse outputs from counter 72 will be hereinafter referred to as clock pulses (CP) and each of the outputs from counter 78 will be hereinafter referred to as timing pulses (TP).

Turning now to FIGS. 4A and 4B, the detailed logical circuit comprising the queuing system of FIG. 1 may be seen by placing FIG. 4A to the left and parallel with FIG. 4B.

The output of Delay Line 10 is fed via conductor 100 to a group of AND gates generally designated as entry gate 14. Within entry gate 14 are a group of ten parallel-arranged AND's 101–110. Also applied as respective inputs to each of AND's 101–110 is a specific timing pulse input which is applied for the purpose of conditioning the respective AND gate during the time which a specific bit of a character time slot is expected from Delay Line 10. For instance, the occupied status bit always occupies the first bit position of a time slot and appears during each character time slot in the middle of a TP2 pulse. The combination of an occupied status bit and a TP2 pulse being applied to AND 101 results in its producing an output indicative of the state of the occupied status bit. Identical occurrences result for AND's 102–110 during succeeding timing pulses. The outputs from AND's 101–110 are applied in parallel over cable 112 to Enter AND 114 and via cable 116 to Bypass AND 16. Two additional conditioning inputs are applied to Enter AND 114 via conductors 118 and 120. An up voltage level normally appears on conductor 118 except during a forward shift operation when it is desired to prevent the insertion of a new data character into Character Register 18. Likewise, conductor 120 is normally conditioned by an up voltage level ($\overline{Bkwd}$) except during the time when it is desired to accomplish a backward character shift. These inputs will be hereinafter discussed in greater detail.

The output from Enter AND 114 is applied via cable 122 to the respective triggers of Character Register 18. While not shown in detail, the gating of a bit of information from a character on conductor 100 through one of AND's 101–110 automatically inserts the bit of the character on a specific conductor within cable 112. This conductor passes through AND 114 and into the proper trigger within Character Register 18 via cable 122. The triggers within Character Register 18 are of the type conventionally found within data processing systems which are capable of being set or reset in accordance with a level applied to an input line for the duration of an applied clock pulse. To avoid unnecessary complexities in the drawing, the clocking input to each of the character register triggers is omitted. Additional inputs to the character register triggers are applied from CPU input AND 124 via cable 126, and terminal input AND 128 via cable 130. These AND gates provide the means for entering data characters into the queuing system from either CPU 20 or Terminal 26. The only other input to Character Register 18 is a specific reset input fed from AND 132 to status bit trigger 56. The operation of this circuit will become clear upon a discussion of the backward shift feature of the queuing system.

An output line is provided from each trigger of Character Register 18 directly into corresponding output AND's 134–145. Also applied to each of these AND gates is a specific timing pulse input and a conditioning input via conductor 146. Conductor 146 is energized at all times to produce a conditioning input to output AND's 134–145, except during the backward shift operation. During the backward shift operation, conductor 146 is conditioned only during timing pulses TP1 and TP2.

The output from status bit trigger 56 which is applied to output AND 134, is also applied via conductor 147 to inverter 149. Inverter 149 produces an inverted version of the occupied status bit ($\overline{occupied}$) and applies it to conductors 151 and 153.

The output conductors from the character register triggers, in addition to being applied to output AND's 134–145, are also applied in parallel over cables 148 and 149 to CPU output AND 150 and Terminal 26 output AND 152, respectively. It is via these circuits, that CPU 20 and Terminal 26 are able to access characters from the queuing system. Each of these AND gates is provided with a plurality of conditioning inputs which will be discussed during the description of the operation of the system.

Output conductors from output AND's 134–145 are fed via cable 154 to a 10-way OR 156. Since each of output AND's 134–145 is sequentially clocked by a timing pulse, the contents of each of the character register triggers is sequentially placed on a specific output line within cable 154. OR 156 combines these outputs onto single conductor 158. Conductor 158 forms the input for trigger 160 which is the first position of serial Shift Register 34. Trigger 160 also has applied thereto over conductor 162 even clock pulses (CP2, CP4, CP6, etc.) from clock pulse generator 72 (FIG. 5). These clock pulses are also applied via conductor 164 to trigger 166 which forms the second storage position of serial Shift Register 34. The output of trigger 160 is fed both to AND 168 and via conductor 170 to AND 172 and inverter 174. The inverted output from inverter 174 feeds AND 176. AND's 172 and 176 also have conditioning inputs applied thereto, i.e., $\overline{Char\ 4}$ input, a delayed CP2 pulse, and the transmit conditioning level. The outputs of AND's 176 and 172 are respectively fed to the set and reset inputs of Forward Shift trigger 178 with the output of AND 172 passing through intervening OR 188. An additional reset input through OR 188 is fed from AND 186 upon the coincidence of Char 4 and CP3 inputs. These circuits basically comprise the Forward Shift Logic circuit 40 of FIG. 1.

AND's 172 and 176 examine the occupied status bit of the time slot contained in Character Register 18 (when it is first shifted into trigger 160) to determine if a character is actually stored therein. If the occupied status bit is a "0" (no character in Character Register 18) AND 176 produces an output which sets Forward Shift trigger 178 which in turn commences the forward shift operation. The setting of Forward Shift trigger 178 causes its output to come up and condition Bypass AND 16 via conductor 180. Bypass AND 16 is connected via 10 conductor cable 192 to 11 input OR 190, the eleventh input of which is applied from AND 168. The output of OR 190 is applied to trigger 166 which comprises the second position of Shift Register 34. The up output of Forward Shift trigger 178 is inverted to a down level by inverter 182 and applied via conductor 188 to decondition Enter AND 114. The down level from inverter 182 is also fed via conductor 184 to decondition AND 168. The deconditioning of Enter AND 114 and conditioning of Bypass AND 16 results in the contents of a new time slot bypassing Character Register 18 and being inserted via cables 116 and 192 into trigger 166. This accomplishes a forward shift of a data character. The deconditioning of AND 168 prevents the "0" occupied status bit in trigger 160 from being shifted into trigger 166.

Trigger 166 has its output simultaneously applied to AND 194 and Backward Shift AND 196. A receive status input, a $\overline{Char\ 4}$ input, a CP4 pulse input, and $\overline{occupied}$ manifestation on conductor are also applied as conditioning inputs to Backward Shift AND 196.

The output of Backward Shift AND 196 is applied as the set input to Backward Shift trigger 198. A reset input to trigger 198 is fed from line 200 which has a CP3 clock pulse applied thereto. Backward Shift trigger 198 has its output applied via conductor 199 to AND 202, inverter 204 and status bit trigger reset AND 132. Inverter 204 produces an up output ($\overline{Bkwd}$) at all times except when Backward Shift trigger 198 produces an up output.

TP1 and TP2 timing pulses are applied to AND 202 via inverters 206 and 208. The outputs of inverters 206 and 208 are up at all times except when timing pulses TP1 and TP2 are present, at which time, they produce down outputs. Thus, when Backward Shift trigger 198 also produces an up level on conductor 199, AND 202 is conditioned to produce an up output. Whenever TP1 or TP2 comes up, the output of AND 202 falls.

The output of AND 202 is inverted in inverter 210 and applied via conductor 146 as a conditioning potential to output AND's 134–145. The output of inverter 210 is normally down during the backward shift operation except during the occurrence of timing pulses TP1 and TP2 when it is up and acts as a conditioning potential. The $\overline{Bkwd}$ output from inverter 204 is applied both to AND 194 via conductor 195 and to Enter AND 114 via conductor 120. AND 194 acts to block any outputs from Shift Register 34 during the backward shift operation whereas Enter AND 114 blocks the input of a new data character. AND 194 feeds the input of Delay Line 10 and completes the recirculation path for the queuing system.

When backward shift AND 196 senses the presence of a "1" occupied status bit in Shift Register trigger 166, and a "0" occupied status bit from a newly inserted occupied status bit in status bit trigger 56, it produces a set output to backward shift trigger 198. As will be recalled, these conditions indicate the presence of a data character in the time slot now in Character Register 18 and no data character in the time slot which is beginning to be inserted into Character Register 18. A backward shift is then accomplished by blocking Enter AND 114 to prevent the contents of the new time slot from affecting the data character held in Character Register 18. Output AND's 134–145 are blocked by the down output of inverter 210 as applied to conductor 146 and the contents of Shift Register 34 are blocked by AND 194. In essence, therefore, the data character in Character Register 18 is "frozen" in place. In addition the time slot it had occupied becomes all zeros.

The circuitry which controls the input of data characters from CPU 20 is AND 212 and CPU transfer trigger 214. The inputs to AND 212 are a transmit status line, a Char 4 line, CP4 line and the $\overline{occupied}$ input. When all of these inputs are conditioned the output of AND 212 rises to set CPU transfer trigger 214 which in turn conditions CPU input AND 124 to allow a data entry from CPU 20 into Character Register 18.

Figure 6B:
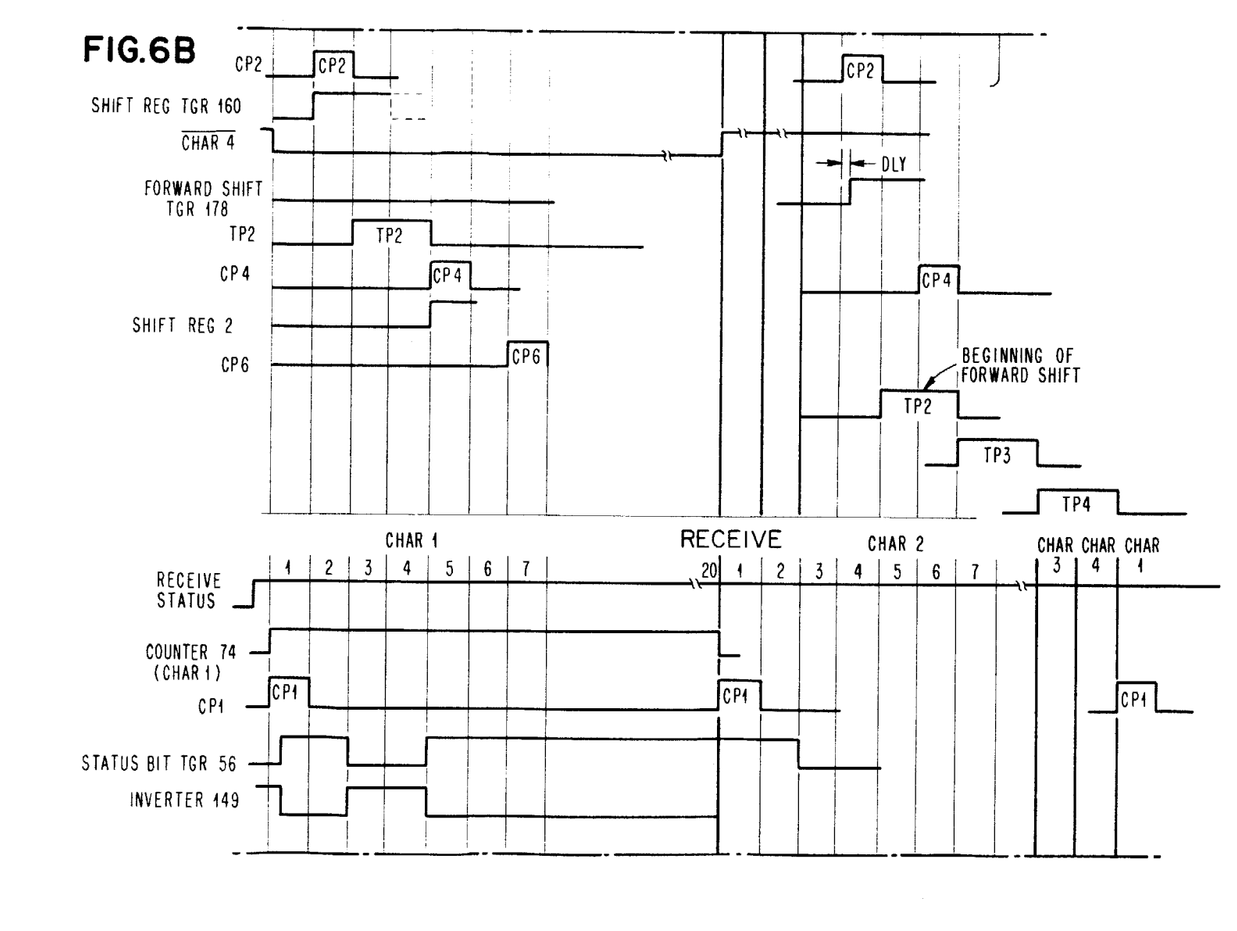
Figure 6C:
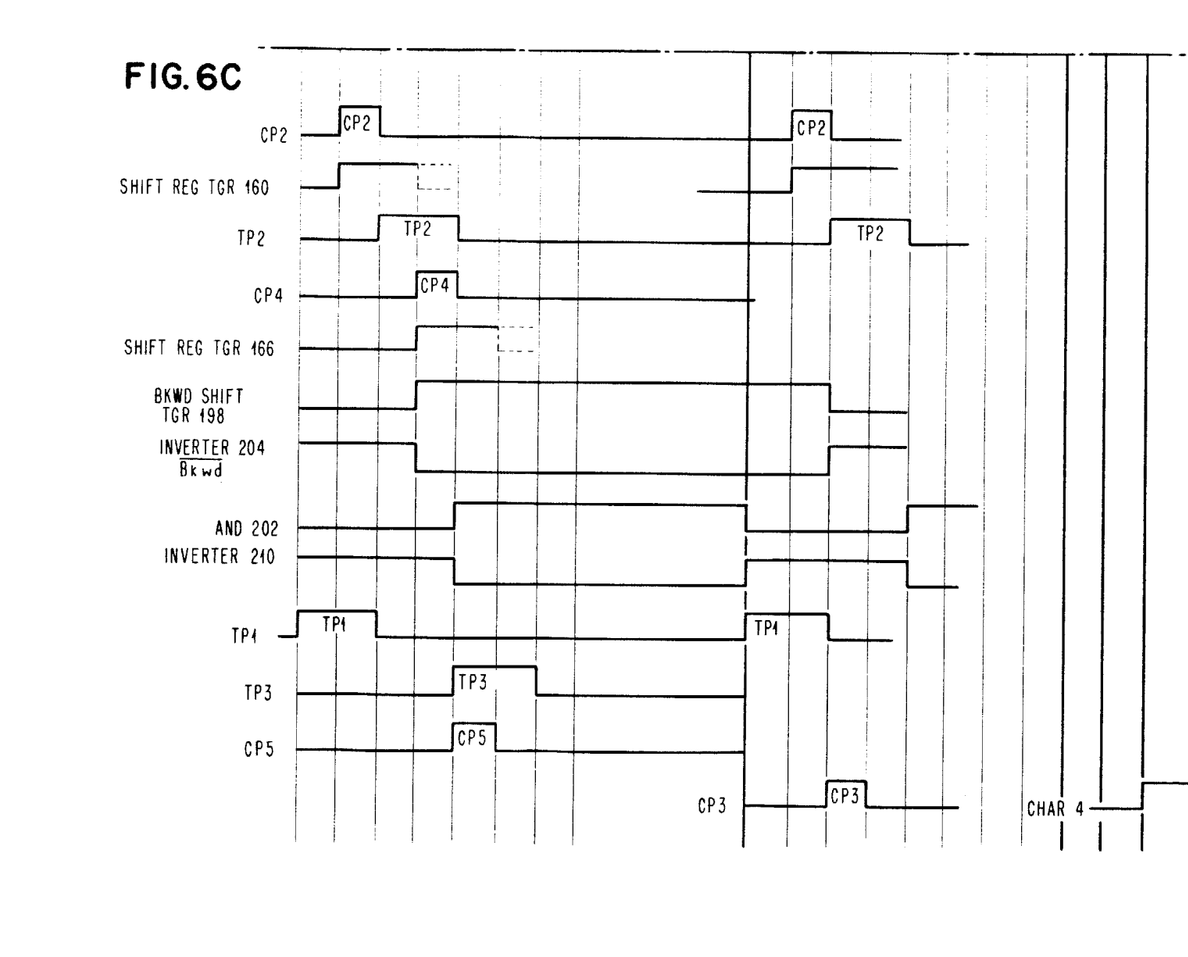

Referring now to the specific waveforms shown in FIGS. 6A, 6B and 6C, the operation of the logical circuit of FIGS. 4A and 4B will be described. Arrange FIGS. 6A, 6B and 6C as shown in FIG. 7. Turning first to a transmit operation, that is, where CPU 20 transfers data characters into the queuing system during Char 4 time slot, the characters so transferred being shifted forward in time to the Char 1 time slot to be there later accessed by the Terminal 26.

To initiate a transfer of data from CPU 20 to Terminal 26, the transmit status line is brought to an up level (FIGS. 4A and 6A). It will be assumed for the purposes of explanation, that the queuing system contains no data characters. As aforestated in the broad description of the system operation, no data transfer can occur from CPU 20 until the Char 4 time slot appears in Character Register 18. This time occurs when the Char 4 output from character counter 74 (FIG. 5) is conditioned. Since there are no data characters contained within the queuing system, status bit trigger 56 in Character Register 18 manifests a down potential on its output line. This down potential is sensed by conductor 147, inverted in inverter 149 and applied over conductor 153 as one input to AND 212. Since the Char 4 and transmit inputs are also at up levels, the occurrence of a CP1 clock pulse fully conditions AND 212 thereby providing a set input to CPU transfer trigger 214. The resulting up level from CPU transfer trigger 214 fully conditions multiple AND 124 thereby allowing a full nine bit data character to be transferred broadside from CPU 20, through AND 124 and cable 126 into Character Register 18. When the data character is transferred, it causes status bit trigger 56 to be set to the "1" state thereby indicating that the time slot is occupied by a data character. (This circuitry is not shown.)

Simultaneously with the above data transfer from CPU 20, Output AND 134 which is connected to status bit trigger 56 is conditioned by the occurrence of timing pulse TP1. The other input to output AND 134 is applied via conductor 146, which, during the transmit operation always carries an up level (FIG. 6A). Thus, upon the occupied status bit being set into status bit trigger 56 it immediately becomes available at the output of AND 134 and is fed via cable 154 through OR 156 and placed on conductor 158.

At the occurrence of the first even clock pulse (CP2), the "1" occupied status bit is set into Shift Register trigger 160. The resulting up level at the output of trigger 160 is applied via conductor 170 to AND 172 and inverter 174. A down output from inverter 174 is applied to AND 176. Additionally, at this time a transmit status input and a slightly delayed CP2 pulse are applied to AND's 172 and 176. However, the $\overline{\text{Char 4}}$ line carries a down level during the Char 4 time slot and thereby deconditions AND's 172 and 176. (The $\overline{\text{Char 4}}$ input is applied to prevent any forward data shifting from occurring in the transmit mode during the Char 4 time slot due to the fact that such a shift would result in a character stored in the Char 1 time slot being shifted into the Char 4 time slot. This would essentially allow the characters to continually be shifted through all positions of the queue rather than causing them to be lined up and available in the same order as inserted at a specific time slot.) Seeing no output from either of AND's 172 or 176, Forward Shift trigger 178 remains at a down output which inhibits via conductor 180 Bypass AND 16. The down output of Forward Shift trigger 178 is inverted in inverter 182 to an up level and applied to conductors 118 and 184 to partially condition Enter AND 114 and fully condition AND 168, respectively. Since this is not a backward shift operation, $\overline{\text{Bkwd}}$ input line 120 to Enter AND 114 is also conditioned to an up level.

Next a TP2 pulse is applied to AND 101 to allow the occupied status bit of the next character of the queue to be transmitted via cable 112 to fully condition Enter AND 114. Enter AND 114 produces a down level on cable 122 which causes a "0" to be entered into status bit trigger 56. Simultaneously, the first bit of the character presently residing in Character Register 18 is readied for insertion into Shift Register 34 by the application of a TP2 pulse to Output AND 135.

Upon the subsequent application of a CP4 clock pulse to shift register triggers 160 and 166, the occupied status bit is transferred from trigger 160 to trigger 166 and the first character bit in Character Register 18 is inserted into trigger 160. Due to the fact that both AND's 168 and 194 are conditioned by respective up voltage inputs on conductors 184 and 195, respectively, the remaining bits of the character in Character Register 18 are sequentially read out and placed into the recirculating data path. This action occurs on each successive even clock pulse as it is applied to Shift Register 34.

At the beginning of the Char 1 time slot, the circuit commences accessing the contents of Character Register 18 via the application of timing pulses to Output AND's 134–145. Since there is no data character in the Char 1 time slot, this action merely results in "0's" being read into Shift Register 34. Thus, when the occupied status bit is read out of Character Register 18 and into Shift Register 34, the application of a CP2 to trigger 160 results in a down output being manifested. This output, indicating the absence of a data character in the Char 1 time slot, is applied via conductor 170 to AND 172 and through inverter 174 to AND 176. The down level on conductor 170 inhibits AND 172 but, due to the inverted output from inverter 174, conditions AND 176. At this point in time, the transmit, delayed CP2 and $\overline{\text{Char 4}}$ inputs are simultaneously at up levels, allowing AND 176 to produce an up level on its output line thereby indicating the empty status of time slot 1. (The CP2 pulse is delayed to assure that the correct output status of trigger 160 is sensed.) The output of AND 176 sets forward shift trigger 178 thereby causing its output to shift to the up level. This up level condition is transmitted by conductor 180 to condition Bypass AND 16. The inverted output of trigger 178, as derived from inverter 182, deconditions Enter AND 114 and AND 168 via conductors 118 and 184, respectively. Through this action, the input to Character Register 18 is blocked and a bypass path through Bypass AND 16 is opened. Additionally, the "0" occupied status bit in trigger 160 is prevented from leaving Shift Register 34 by virtue of the blocked condition of AND 168.

As can be seen from the circuit, forward shift trigger 178 can only be reset by two conditions. One of these is an indication of a "1" occupied status bit from AND 172 and the other is an output from AND 186 during CP3 time in the Char 4 time slot. Thus, forward shift trigger 178, once it is set into the state allowing a forward shift to occur, is reset only when it finds a full character time slot or during the Char 4 time slot when no further shifting is allowed. For this reason, forward shifts through Bypass AND 16 occur irrespective of the fact that no data characters are contained in the respective character time slots. In this case, the Forward Shift circuitry remains energized during the Char 1 and Char 2 time slots.

At the beginning of the Char 3 time slot the data character previously inserted during the Char 4 time slot begins to exit from Delay Line 10. The first bit to exit is the "1" occupied status bit which is applied to AND 101 shortly after the leading edge of timing pulse TP2. These inputs result in AND 101 producing an up output which is placed on cable 112. Since Enter AND 114 is deconditioned by the down level on conductor 118 and Bypass AND 16 is conditioned by the up level on conductor 180, the output from AND 101 is diverted down onto cable 116, passed through Bypass AND 16 to conductor 192 and is applied to OR 190. The appearance of CP4 on conductor 164 causes the "1" occupied status bit to be inserted into Shift Register trigger 166. This action repeats itself for all of the remaining bits of the data character previously inserted during the previous Char 4 time slot. The data character is then shifted forward in time into a preceding time slot completely bypassing the one time slot delay it would normally experience in Character Register 18.

As soon as the data character in time slot 4 has been shifted forward to time slot 3, the Char 4 time slot in Character Register 18 becomes available. A new data character may then be entered from CPU 20 into Character Register 18.

The data shifting operation continued until all time slots in the queue are filled with data characters, at which time the status bit trigger 56 in Character Register 18 invariably indicates the full status of the queue. This status is sensed by AND 212 and inhibits further data entry from CPU 20. Upon request, Terminal 26 is able to access a character from the queue via AND 152. This occurs during the Char 1 time slot when the CP1 line into AND 152 becomes conditioned. A broadside transfer of a gated character is then effected.

Turning now to the operation of the queuing system in the receive status, that is, when data transmission is desired from Terminal 26 to CPU 20, assume first that the queuing system has no characters stored therein and that CPU 20 is capable of accepting data characters at a greater rate than Terminal 26 can supply them. The receive status line is on and transmit status line off. Since Terminal 26 only has access to the queuing system during the Char 1 time slot, this description will begin with the energization of the Char 1 output of character counter 74 (FIGS. 5 and 6B). Since no data characters are stored in the queue, the output of status bit trigger 56 is at a down level. This level is inverted by inverter 149 and applied as a conditioning input (occupied) to Terminal Input AND 128. Also applied as conditioning inputs to AND 128 is the up level on the Receive status line, a Char 1 input and a delayed CP1 pulse. The full conditioning of AND 128 allows Terminal 26 to transfer a data character via cables 129 and 130 into Character Register 18. This action causes the output of status bit trigger 56 to be set to the "1" state. The up output from status bit trigger 56 in combination with a TP1 pulse, fully conditions AND 134 to produce an up output (remembering that conductor 146 is conditioned during TP1 and TP2 in the receive operation).

The subsequent application of CP2 to trigger 160 causes its output to assume an up state indicating a "1" occupied status bit. Due to the fact that the transmit status line is deconditioned, the entire forward shift logic circuit is inhibited from operation. The resulting down output from Forward Shift trigger 178 is inverted by inverter 182 and applied over conductors 184 and 118 to condition AND 168 and Enter AND 114, respectively. Immediately after the occupied status bit is shifted out of status bit trigger 56, a new occupied status bit for Char 2 time slot is entered therein due to the conditioning of AND 101 by TP2. In this case, the output of status bit trigger 56 shifts to a down level due to the lack of a data character in time slot 2. In response to the down level the output of inverter 149 rises and is applied to conductor 151.

While not shown in FIG. 6B, the CP3 pulse is the next pulse to occur and causes a reset action to occur in the backward shift logic circuitry (to be discussed in greater detail hereinafter). The next occurring pulse is CP4 which causes the "1" status bit in shift register trigger 160 to be shifted through AND 168, OR 190 and into trigger 166. Depending upon the state of the first bit of the character presently in Character Register 18, trigger 160 will be set to an identical output state.

The resulting up output from trigger 166 is applied to Backward Shift AND 196 along with the following inputs: a receive status line, a $\overline{\text{Char 4}}$ line, conductor 151 from inverter 149 and a CP4 line. At this specific time, all of these inputs to Backward Shift AND 196 are conditioned thereby causing it to create a set input to backward shift trigger 198. Note, that it is the combination of the "1" occupied status bit in shift register trigger 166 and a "0" occupied status bit in status bit trigger 56 (from the about-to-be-inserted character time slot) which fully conditions Backward Shift AND 196. These respective status bits indicate that a data character now resides in Character Register 18 and that no data character is contained in the new time slot being inserted into Character Register 18. Thus the conditioning of Backward Shift AND 196 is indicative of the fact that a backward shift is about to occur. To accomplish this shift requires that both the entrance and exit gates from Character Register 18 be blocked to prevent any alteration of the stored data character by the new time slot. This is accomplished as follows. The set input to backward shift trigger 198 causes its output conductor 199 to shift to the up level thereby causing the output from inverter 205 ($\overline{Bkwd}$) to fall to the down level. This down level is applied to AND 194 via conductor 195 and blocks the output of Shift Register 34. The down output from inverter 204 is also applied to decondition Enter AND 114. Note that the deconditioning of Enter AND 114 occurs prior to the application of TP3 to AND 102. This action prevents the first bit of the Char 2 time slot from entering Character Register 18 and destroying the first bit of the data character stored therein.

The up level from backward shift trigger 198 is also applied via conductor 199 to AND 202. Of the other two inputs to AND 202, the TP1 input to inverter 206 is at a down level thereby allowing inverter 206 to produce an up level and the TP2 input is up thereby compelling inverter 208 to produce a down inhibiting level. Thus AND 202 does not produce an immediate shift in output in response to a conditioning output from backward shift trigger 198. It is not until the end of TP2 that AND 202 becomes fully conditioned to produce an up output. This output is inverted by inverter 210 and applied via conductor 146 to inhibit Output AND's 134–145. This prevents any further readout from Character Register 18.

With the input and output gates to Character Register 18 blocked and the output from Shift Register 34 blocked, no data is inserted into Delay Line 10 for the duration of the Char 1 time slot. To retrieve the occupied status bit which was destroyed by the insertion of the occupied status bit of time slot 2, a CP5 pulse is applied to Reset AND 132 in combination with an output from backward shift trigger 198. This thereby causes a reset input to be applied to the status bit trigger 56 to set it back to the "1" state. The subsequent application of shift pulses to shift register triggers 160 and 166 causes them to be reset.

This action thereby accomplishes the placement of the data character previously inserted into the Char 1 time slot into the Char 2 time slot.

During the Char 2 time slot, a TP1 input to inverter 206 causes the output of AND 202 to shift to the down level. Inverter 210 is then caused to produce an up level which partially conditions Output AND's 134–145. The TP1 pulse is also applied to AND 134 and, in combination with the up level from status bit trigger 56 results in a "1" output being produced therefrom. Enter AND 114 is still deconditioned by the down level on conductor 120. A CP2 pulse applied via conductor 162 to shift register trigger 160 causes the "1" occupied status bit from AND 134 to be entered thereinto. Immediately thereafter, a CP3 pulse is applied to backward shift trigger 198 causing it to be reset. The resulting down level on conductor 199 causes inverter 204 to produce an up level which thereby conditions Enter AND 114 via conductor 120. Simultaneously, a TP2 pulse is applied to AND 101 allowing the occupied status bit for character time slot 3 to be inserted into status bit trigger 56. Assuming that this status bit is a "0," the output of the status bit trigger 56 falls, is inverted to an up level by inverter 149 and applied via conductor 151 as a partial conditioning input to Backward Shift AND 196. Upon the subsequent application of CP4, the occupied status bit presently held in trigger 160 is transferred to trigger 166 causing its output to rise and fully condition Backward Shift AND 196. This in turn causes the setting of backward shift trigger 198 with the final result being that the character presently in Character Register 18 is delayed for the duration of the Char 3 time slot.

The above action occurs repetitively until the occurrence of Char 4 time, when the $\overline{\text{Char 4}}$ input to Backward Shift AND 196 falls thereby inhibiting any further backward shifts.

During Char 4 time, CPU 20 can access a data character from Character Register 18 via cable 148 and AND 150. The conditioning inputs to AND 150 are a slightly delayed CP1 pulse, a Char 4 line and a receive status line.

While the invention has been particularly shown and described with reference to a preferred embodiment thereof, it will be understood by those skilled in the art that various changes in form and detail may be made therein without departing from the spirit and scope of the invention.

What is claimed is:

1. In a queuing system adapted to store a plurality of data segments in a circulating queue of time slots, delay means having an input and output and adapted to store a plurality of data segments in discrete time slots;

recirculating means coupling the output of said delay means to its input, the propagation delay through said recirculating means encompassing at least one time slot;

first data transfer means coupled to said recirculating means and enabled during one time slot of said queue to insert a data segment therein;

second data transfer means coupled to said recirculating means and enabled during a preceding time slot of said queue to access any data segment stored therein;

forward shift logic means coupled to said recirculating means for examining the contents of a time slot within said recirculating means and adapted to produce an output signal if said time slot is found to be empty;

bypass means included within said recirculating means and enabled by said output signal to provide a bypass around said one time slot propagation delay for the contents of a time slot which immediately succeeds said examined time slot; and cyclic means for repetitively operating said forward shift logic means to accomplish the shifting of said inserted data segment from said one time slot of said queue to said succeeding time slot of said queue.

2. In a queuing system adapted to store a plurality of data segments in a circulating queue of time slots, each said time slot provided with a status bit position to indicate the presence or absence of a data segment therein:

delay means having an input and output and adapted to store a plurality of data segments in discrete time slots;

recirculating means coupling the output of said delay means to its input, the propagation delay through said recirculating means encompassing at least one time slot;

first data transfer means coupled to said recirculating means and enabled during the last time slot of said queue to insert a data segment therein and to set said status bit position to a "full" indication;

second data transfer means coupled to said recirculating means and enabled during the first time slot of said queue to access any data segment stored therein;

forward shift logic means coupled to said recirculating means for examining the status bit position of a time slot within said recirculating means and adapted to produce an output signal if said status bit is found to indicate "empty";

bypass means included within said recirculating means and enabled by said output signal to shift the contents of a time slot which immediately succeeds the time slot whose status bit position was examined around said one time slot propagation delay in said recirculating means; and cyclic means for repetitively operating said forward shift logic means to accomplish the shifting of said inserted data segment from said last time slot of said queue to said first time slot of said queue.

3. In a queuing system adapted to store a plurality of data characters in a circulating queue of time slots, each said time slot provided with a status bit position to indicate the presence or absence of a data character stored therein;

delay means having an input and output and adapted to store a plurality of data characters in discrete time slots;

recirculating means including a serially connected character register and shift register coupling the output of said delay means to its input, the propagation delay through said character register encompassing at least one time slot;

first data transfer means coupled to said character register and enabled during the last time slot of said queue to insert a data character therein and to set said status bit position to a "full" indication;

second data transfer means coupled to said character register and enabled during the first time slot of said queue to access any data character stored therein;

a forward shift logic circuit coupled to said shift register for examining the status bit position of a time slot within said character register when said status bit is transferred to said shift register and adapted to produce an output signal if said status bit is found to indicate "empty";

bypass gate means connected around said character register and enabled by said output signal to shift the contents of a time slot which immediately succeeds the time slot whose status bit position was examined around said one time slot propagation delay in said character register; and cyclic means for repetitively operating said forward shift logic circuit to accomplish the shifting of said inserted data character from said last time slot of said queue to said first time slot of said queue.

4. In a queuing system adapted to store a plurality of data segments in a circulating queue of time slots, delay means having an input and output and adapted to store a plurality of data segments in discrete time slots;

recirculating means coupling the output of said delay means to its input, the propagation delay through said recirculating means encompassing at least one time slot;

first data transfer means coupled to said recirculating means and enabled during one time slot of said queue to access a data segment stored therein;

second data transfer means coupled to said recirculating means and enabled during a preceding time slot of said queue to insert a data segment therein;

backward shift logic means for examining the contents of a first time slot within said recirculating means and a succeeding time slot about to enter said recirculating means and adapted to produce an output signal if a data segment is found in said first time slot and none in said succeeding slot;

blocking means responsive to said output signal to prevent said data segment in said first time slot from leaving said recirculating means for the duration of said succeeding time slot and for blocking said succeeding time slot from altering said data segment, said data segment thereby being shifted to said succeeding time slot; and means for repetitively operating said backward shift logic means to accomplish the shifting of said data segment from said one time slot of said queue to said preceding slot of said queue.

5. In a queuing system adapted to store a plurality of data segments in a circulating queue of time slots, each said time slot provided with a status bit position to indicate the presence or absence of a data segment therein;

delay means having an input and output and adapted to store a plurality of data segments in discrete time slots;

recirculating means coupling the output of said delay means to its input, the propagation delay through said recirculating means encompassing at least one time slot;

first data transfer means coupled to said recirculating means and enabled during the last time slot of said queue to access a data segment stored therein;

second data transfer coupled to said recirculating means and enabled during the first time slot of said queue to insert a data segment therein and to set said status bit position to a "full" indication;

backward shift logic means for examining the status bit position of one time slot within said recirculating means and the status bit position of a succeeding time slot about to enter said recirculating means and adapted to produce an output signal if the status bit position for said one time slot indicates "full" and the status bit position for said succeeding slot indicates "empty";

blocking means responsive to said output signal to prevent said data segment in said one time slot from leaving said recirculating means for the duration of said succeeding time slot and for blocking said succeeding time slot from altering said data segment, said data segment thereby being shifted to said succeeding time slot; and means for repetitively operating said backward shift logic means to accomplish the shifting of said data segment from the first time slot of said queue to the last time slot of said queue.

6. In a queuing system adapted to store a plurality of data character in a circulating queue of time slots, each said time slot provided with a status bit position to indicate the presence or absence of a data character stored therein;

delay means having an input and output and adapted to store a plurality of data characters in discrete time slots;

recirculating means including a serially connected character register and shift register coupling the output of said delay means to its input, the propagation delay through said character register encompassing at least one time slot;

first data transfer means coupled to said character register and enabled during the last time slot of said queue to access a data character stored therein;

second data transfer means coupled to said character register and enabled during the first time slot of said queue to insert a data character therein and to simultaneously set said first time slot's status bit position to a "full" indication;

a backward shift logic circuit coupled to said shaft register and character register for examining the status bit position of one time slot within said character register when said status bit is transferred to said shift register and the status bit of a succeeding time slot beginning to enter said character register and adapted to produce an output signal if the status bit for said one time slot indicates "full" and the status bit for said succeeding slot indicates "empty";

blocking means responsive to said output signal to prevent said data character in said one time slot from leaving said character register for the duration of said succeeding time slot and for blocking the contents of said succeeding time slot from altering said data character in said character register, said one time slot data character thereby being shifted to said succeeding time slot; and cyclic means for repetitively operating said backward shift logic circuit to accomplish the shifting of said data character from the first time slot of said queue to the last time slot of said queue.

7. In a queuing system adapted to store a plurality of data segments in a circulating queue, delay means having an input and output and adapted to store a plurlity of data segments in descrete time slots, recirculating means coupling the output of said delay means to its input, the propagation delay through said recirculating means encompassing at least one time slot, said recirculating means including logic means for examining the contents of a time slot and for generating a signal if no data segment is contained therein; and further including bypass means responsive to said signal to provide an electrical path circumventing a propagation delay of at least one time slot in said recirculating means to thereby allow the contents of a time slot to be inserted into a preceding time slot, first bidirectional data transfer means coupled to said recirculating means and enabled during the last time slot of said queue to transfer a data segment into said last slot in response to a signal from said logic means, said transferred data segment, upon subsequent recirculations through said recirculation means, being caused to transfer to preceding non-data segment containing time slots through the operation of said bypass means; thereby allowing additional data segments to be transferred from said first bidirectional data transfer means; and second bidirectional data transfer means coupled to said recirculating means and enabled during the first time slot of said queue to access said transferred data segment upon it being shifted into said first time slot.

8. In a queuing system adapted to store a plurality of data segments in a circulating queue of time slots, said system provided with a first and second mode of operation:

delay means having an input and output and adapted to store a plurality of data segments in discrete time slots;

recirculating means coupling the output of said delay means to its input, the propagation delay through said recirculating means encompassing at least one time slot;

first bilateral data transfer means coupled to said recirculating means and enabled in said first mode to access a data segment stored in the last time slot of said queue and in a second mode, to insert a data segment therein;

second bilateral data transfer means coupled to said recirculating means and enabled in said first mode to insert a data segment in the first time slot of said queue and in a second mode, to access a data segment stored therein;

backward shift logic means enabled during said first mode for examining the contents of one time slot within said recirculating means and a succeeding time slot about to enter said recirculating means and adapted to produce an output signal if a data segment is found in said one time slot and none in said succeeding slot;

blocking means responsive to said output signal to prevent said one time slot data signal from leaving said recirculating means for the duration of said succeeding time slot and for blocking said succeeding time slot from altering the contents of said recirculating means, said one time slot data segment thereby being shifted to said succeeding time slot;

forward shift logic means coupled to said recirculating means and enabled during said second mode for examining the contents of a time slot within said recirculating means and adapted to produce an output signal if said time slot is found to be "empty";

bypass means included within said recirculating means and enabled by said output signal to provide a bypass around said one time slot propagation delay for the contents of a time slot which immediately succeeds said examined time slot; and cyclic means for repetitively operating said forward shift logic means during said second mode and said backward shift logic means during said first mode to accomplish a shifting of said inserted data segments from one end of said queue to the other end of said queue.

9. In a queuing system adapted to store a plurality of data segments in a circulating queue of time slots, each said time slot provided with a status bit position to indicate the presence or absence of a stored data segment, said system provided with a first and second mode of operation:

delay means having an input and output and adapted to store a plurality of data segments in discrete time slots;

recirculating means coupling the output of said delay means to its input, the propagation delay through said recirculating means encompassing at least one time slot;

first bilateral data transfer means coupled to said recirculating means and enabled in said first mode to access a data segment stored in the last time slot of said queue and in a second mode, to insert a data segment therein and to set said status bit position to a full indication;

second bilateral data transfer means coupled to said recirculating means and enabled in said first mode to insert a data segment in the first time slot of said queue and to set said status bit position to a full indication and in a second mode, to access a data segment stored therein;

backward shift logic means enabled during said first mode for examining the status bit position of one time slot within said recirculating means and the status bit position of a succeeding time slot about to enter said recirculating means and adapted to produce an output signal if the status bit position for said one time slot indicates "full" and the status bit position for said succeeding slot indicates "empty";

blocking means responsive to said output signal to prevent said data segment in said one time slot from leaving said recirculating means for the duration of said succeeding time slot and for blocking said succeeding time slot from altering said data segment, said data segment thereby being shifted to said succeeding time slot;

forward shift logic means coupled to said recirculating means and enabled only during said second mode for examining the status bit position of a time slot within said recirculating means and adapted to produce an output signal if said status bit is found to indicate "empty";

bypass means included within said recirculating means and enabled by said output signal to provide a bypass circuit around said one time slot propagation delay in said recirculating means for the contents of a time slot which immediately succeeds the time slot whose status bit position was examined; and cyclic means for repetitively operating said forward shift logic means during said second mode and said backward shift logic means during said first mode to accomplish a shifting of said inserted data segments from one end of said queue to the other end of said queue.

10. In a queuing system adapted to store a plurality of data characters in a circulating queue of time slots, each said time slot provided with a status bit position to indicate the presence or absence of a data character, said system provided with a first and second mode of operation:

delay means having an input and output and adapted to store a plurality of data characters in discrete time slots;

recirculating means including a serially connected character register and shift register coupling the output of said delay means to its input, the propagation delay through said character register encompassing at least one time slot;

first bilateral data transfer means coupled to said character register and enabled in said first mode to access a data character stored in the last time slot of said queue and in a second mode, to insert a data character therein and to set said status bit position to a "full" indication;

second bilateral data transfer means coupled to said character register and enabled in said first mode to insert a data character in the first time slot of said queue and to set said status bit position to a "full" indication and in a second mode, to access a data character stored therein;

a backward shift logic circuit coupled to said shift register and character register and enabled during said first mode to examine the status bit of one time slot within said character register when said status bit is transferred to said shift register and the status bit of a succeeding time slot just entered in said character register and adapted to produce an output signal if the status bit for said one time slot indicates "full" and the status bit for said succeeding slot indicates "empty";

a blocking circuit responsive to said output signal to prevent said data character in said one time slot from leaving said character register for the duration of said succeeding time slot and for blocking the contents of said succeeding time slot from altering said data segment, said data character thereby being shifted to said succeeding time slot;

a forward shift logic circuit coupled to said shift register and enabled only during said second mode for examining the status bit position of a time slot within said character register and adapted to produce an output signal if said status bit is found to indicate "empty";

a bypass circuit connected between said delay means and shift register and enabled by said output signal to provide a bypass circuit around said one time slot propagation delay in said character register for the contents of a time slot which immediately succeeds the time slot whose status bit position was examined; and cyclic means for repetitively operating said forward shift logic circuit during said second mode and said backward shift logic circuit during said first mode to accomplish a shifting of said inserted data characters from one end of said queue to the other end of said queue.

References Cited

UNITED STATES PATENTS

| 3,166,734 | 1/1965 | Helfrich | 340—147 |
| 3,185,823 | 5/1965 | Ellersick et al. | 235—154 |
| 3,275,993 | 9/1966 | Bartlett et al. | 340—172.5 |
| 3,289,171 | 11/1966 | Scherr et al. | 340—172.5 |
| 3,309,671 | 3/1967 | Lekven | 340—172.5 |

ROBERT C. BAILEY, *Primary Examiner.*

I. S. KAVRUKOV, *Assistant Examiner.*